United States Patent
Moriizumi (10) Patent No.: US 9,873,412 B2
(45) Date of Patent: Jan. 23, 2018

(54) VEHICLE SPEED CONTROL APPARATUS

(71) Applicant: Kiyotaka Moriizumi, Nisshin (JP)

(72) Inventor: Kiyotaka Moriizumi, Nisshin (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 42 days.

(21) Appl. No.: 14/785,080

(22) PCT Filed: Apr. 23, 2013

(86) PCT No.: PCT/JP2013/061862
§ 371 (c)(1),
(2) Date: Oct. 16, 2015

(87) PCT Pub. No.: WO2014/174585
PCT Pub. Date: Oct. 30, 2014

(65) Prior Publication Data
US 2016/0075313 A1    Mar. 17, 2016

(51) Int. Cl.
*B60T 7/12*    (2006.01)
*B60T 8/32*    (2006.01)
*B60T 7/22*    (2006.01)

(52) U.S. Cl.
CPC .................................. *B60T 7/12* (2013.01); *B60T 7/22* (2013.01); *B60T 8/321* (2013.01); *B60T 2201/022* (2013.01)

(58) Field of Classification Search
CPC ... B60T 7/12; B60T 8/321; B60T 7/22; B60T 2201/022
See application file for complete search history.

(56) References Cited

U.S. PATENT DOCUMENTS

| | | | | |
|---|---|---|---|---|
| 3,080,019 | A * | 3/1963 | Hastings, Jr. | B60T 7/12 187/224 |
| 3,300,639 | A * | 1/1967 | Bowman | B61L 3/00 246/182 B |
| 3,331,641 | A * | 7/1967 | Wilson | B60T 8/17613 137/48 |
| 5,951,119 | A * | 9/1999 | Eckert | B60T 8/4854 188/356 |
| 6,199,963 | B1 * | 3/2001 | Shimizu | B60T 7/12 303/116.2 |

(Continued)

FOREIGN PATENT DOCUMENTS

CN    102673545 A    9/2012
CN    102837698 A    12/2012

(Continued)

*Primary Examiner* — Rodney Butler
*Assistant Examiner* — Frederick Brushaber
(74) *Attorney, Agent, or Firm* — Finnegan, Henderson, Farabow, Garrett & Dunner, LLP (57) ABSTRACT

A vehicle speed control apparatus is configured to determine, based on an automatic brake duration time and a vehicle speed reduction amount, whether to suppress a brake force due to an automatic brake control, the automatic brake duration time being from an automatic brake control starting timing to a current time point, the vehicle speed reduction amount corresponding to a value obtained by subtracting a vehicle speed at the current time point from the vehicle speed at the automatic brake control starting timing.

6 Claims, 6 Drawing Sheets

(56) References Cited

U.S. PATENT DOCUMENTS

| | | | |
|---|---|---|---|
| 8,972,161 B1* | 3/2015 | Koebler | G01C 21/3469 340/995.27 |
| 2001/0037171 A1 | 11/2001 | Sato | |
| 2002/0091479 A1* | 7/2002 | Maruko | B60T 7/22 701/96 |
| 2005/0171676 A1 | 8/2005 | Seki | |
| 2005/0269874 A1* | 12/2005 | Ishimoto | B60T 8/1755 303/146 |
| 2005/0275285 A1* | 12/2005 | Higuchi | B60T 8/1755 303/146 |
| 2008/0288150 A1* | 11/2008 | Isogai | B60T 7/22 701/70 |
| 2008/0312834 A1* | 12/2008 | Noda | B60T 7/22 701/301 |
| 2009/0088940 A1* | 4/2009 | Tanimichi | B60T 7/22 701/74 |
| 2010/0121546 A1* | 5/2010 | Ikushima | B60K 23/04 701/67 |
| 2011/0082623 A1* | 4/2011 | Lu | B60W 10/06 701/41 |
| 2011/0130964 A1* | 6/2011 | Kitagawa | G01C 21/3697 701/301 |
| 2012/0239266 A1 | 9/2012 | Kato et al. | |
| 2013/0024073 A1 | 1/2013 | Son | |
| 2014/0025275 A1* | 1/2014 | Kindel | G08G 1/096741 701/93 |
| 2014/0244128 A1* | 8/2014 | Watanabe | B60T 8/1755 701/74 |

FOREIGN PATENT DOCUMENTS

| | | |
|---|---|---|
| EP | 1 300 275 A1 | 4/2003 |
| JP | 2001-122094 | 5/2001 |
| JP | 2001-310716 A | 11/2001 |
| JP | 2006-160205 | 6/2006 |
| JP | 2008-290600 | 12/2008 |
| WO | WO 2008/020290 A1 | 2/2008 |

* cited by examiner

|  |  | CONTROL START VEHICLE BODY SPEED [km/h] | | | |
|---|---|---|---|---|---|
|  |  | 75≧V0>55 | 55≧V0>52 | 52≧V0>48 | ... |
| AUTOMATIC BRAKE DURATION TIME T [ms] | T1≦768 | $V_{th}$=27 | $V_{th}$=28 | $V_{th}$=27 | ... |
| | 768<T1≦816 | $V_{th}$=31 | $V_{th}$=31 | $V_{th}$=32 | ... |
| | 816<T1≦912 | $V_{th}$=34 | $V_{th}$=35 | $V_{th}$=36 | ... |
| | 912<T1≦996 | $V_{th}$=37 | $V_{th}$=38 | $V_{th}$=39 | ... |
| | ... | ... | ... | ... | ... |

VEHICLE SPEED CONTROL APPARATUS

CROSS-REFERENCE TO RELATED APPLICATIONS

This application is a national phase application of International Application No. PCT/JP2013/061862, filed Apr. 23, 2013, the content of which is incorporated herein by reference.

TECHNICAL FIELD

The disclosure is related to a vehicle speed control apparatus.

BACKGROUND ART

A travel control apparatus is known which calculates a risk, of a collision with a following vehicle when a brake is applied according to a setting value from measurement values of an inter-vehicle distance and a relative speed with respect to a preceding vehicle, measurement values of an inter-vehicle distance and a relative speed with respect to the following vehicle, and a setting value of a distance for automatically applying the brake and a braking force for being automatically applied, and corrects the setting value of the distance for automatically applying the brake and the braking force for being automatically applied so that the risk becomes less than or equal to a predetermined level when the calculated risk is higher than the predetermined level.

[Patent Document 1] Japanese Laid-open Patent Publication No. 2008-290600

DISCLOSURE OF INVENTION

Problem to be Solved by Invention

An automatic brake control that generates, based on a detection result of an obstacle around a vehicle, a brake force regardless of a brake operation by a driver is useful for ensuring safety of the driver, etc. However, during the automatic brake control, when an intentional great brake force (that is greater than a control target) is generated due to a certain failure, a risk of a collision with a following vehicle becomes high. Thus, it is important to immediately detect such a state to suppress the brake force. This holds true for other speed controls (acceleration control, for example) other than the automatic brake control.

With respect to this point, according to the configuration disclosed in Patent Document 1, the setting value of the brake force is corrected according to the risk of the collision with the following vehicle, which can suppress the brake force in relation to the following vehicle. However, according to the configuration disclosed in Patent Document 1, the measurement values of the inter-vehicle distance and the relative speed with respect to the following vehicle are necessary (i.e., a rear radar sensor, etc., is necessary), which causes the increased cost of the configuration.

Therefore, an object of the present disclosure is to provide a vehicle speed control apparatus that can appropriately control a vehicle speed without using a rear radar sensor.

Means to Solve the Problem

According to one aspect of the present disclosure, a vehicle speed control apparatus is configured to determine, based on an automatic brake duration time and a vehicle speed reduction amount, whether to suppress a brake force due to an automatic brake control, the automatic brake duration time being from an automatic brake control starting timing to a current time point, the vehicle speed reduction amount corresponding to a value obtained by subtracting a vehicle speed at the current time point from the vehicle speed at the automatic brake control starting timing.

Advantage of the Invention

According to the present disclosure, a vehicle speed control apparatus can be obtained which can appropriately control a vehicle speed without using a rear radar sensor.

BEST MODE FOR CARRYING OUT THE INVENTION

In the following, embodiments are described in detail with reference to appended drawings.

Figure 1:
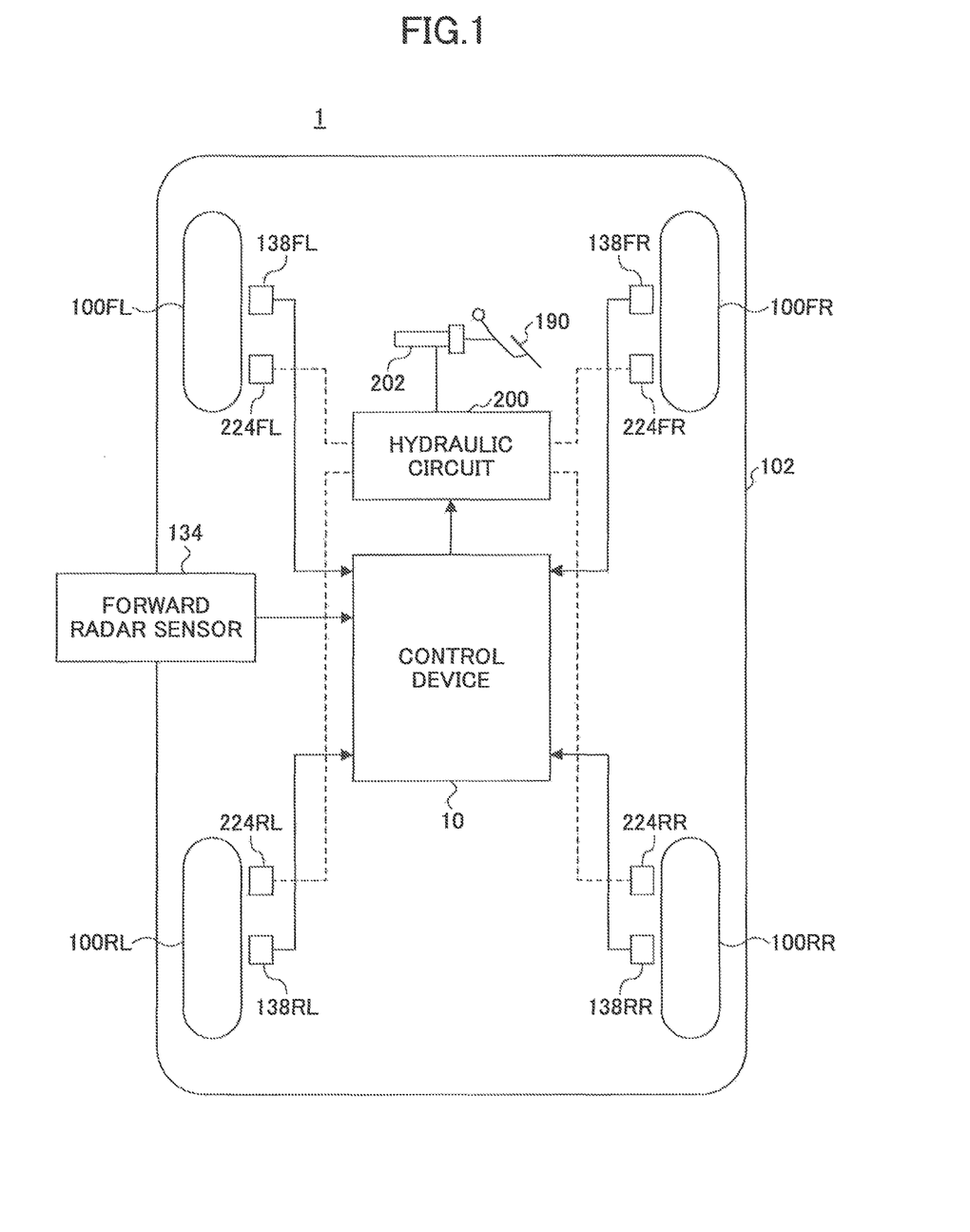
FIG. 1 is a diagram schematically illustrating a configuration of a vehicle brake apparatus 1 according to an embodiment and a main portion of a vehicle 102 in which the vehicle brake apparatus 1 is installed.

FIG. 1 is a diagram schematically illustrating a configuration of a vehicle brake apparatus 1 according to an embodiment and a main portion of a vehicle 102 in which the vehicle brake apparatus 1 is installed.

In FIG. 1, reference numerals 100FL and 100FR indicate left and right front wheels of the vehicle 102, and reference numerals 100RL and 100RR indicate left and right rear wheels of the vehicle. It is noted that the left and right front wheels 100FL and 100FR are steered via a tie rod with a power steering apparatus that is driven in response to a steering operation of a steering wheel.

The vehicle brake apparatus 1 includes a control device 10 and a hydraulic circuit 200. The brake forces of the respective wheels 100FR, 100FL, 100RR and 100RL are generated by hydraulic pressures supplied to wheel cylinders 224FR, 224FL, 224RR and 224RL, respectively, The hydraulic circuit 200 has a master cylinder 202 installed therein. The master cylinder 202 generates, in response to a pressing down operation of a brake pedal 190 by a driver, the hydraulic pressures to be supplied to wheel cylinders 224FR, 224FL, 224RR and 224RL.

The control device 10 may be an ECU (Electronic Control Unit) that includes a microcomputer. The function of the control device may be implemented by any hardware, software, firmware, or any combination thereof. For example, any part of or all of functions of the drive support ECU 10 may be implemented by an ASIC (application-specific Integrated Circuit), a FPGA (Field Programmable Gate Array), a DSP (Digital Signal Processor), etc. It is noted that the function of the control device 10 may be implemented by a plurality of ECUs in cooperation.

The control device 10 is connected to a forward radar sensor 134. The forward radar sensor 134 detects a state of a forward obstacle (a preceding vehicle, etc., for example) in front of a host vehicle using a radio wave (millimeter wave, for example), a light wave (laser, for example) or an ultrasonic wave as a detection wave. The forward radar sensor 134 detects information which represents a relationship between the forward obstacle and the host vehicle such as a relative speed, a relative distance and a direction is lateral position) of the forward obstacle with respect to the host vehicle, for example, at a predetermined cycle. It is noted that if the forward radar sensor 134 is a millimeter wave radar sensor, the millimeter wave radar sensor may be of an electronic controlled scanning type, for example. In this case, the relative speed of the forward obstacle is detected using a Doppler frequency (frequency shift) of the radio wave, the relative distance of the forward obstacle is detected using a delayed time of the reflection wave, and the direction of the forward obstacle is detected based on a shift difference of the received waves between a plurality of reception antennas. The detection data is transmitted to the control device 10 at a predetermined cycle. It is noted that any functions of the forward radar sensor 134 (a function of calculating the position of the forward obstacle, for example) may be implemented by the control apparatus 10.

An image sensor may be used in addition to or instead of the forward radar sensor 134. The image sensor includes a camera, which includes imaging elements such as CCDs (charge-coupled device), CMOSs (complementary metal oxide semiconductor), etc., and an image processor to recognize the state of the forward obstacle. The image sensor may be of a stereo type or include two or more cameras that are provided in different manners. The image sensor detects, based on an image recognition result, the information which represents the relationship between the forward obstacle and the host vehicle such as a relative speed, and position information of the forward obstacle with respect to the host vehicle, for example, at a predetermined cycle. The position information of the forward obstacle includes information related to the position (distance) of the forward obstacle in the back-and-forth direction of the host vehicle, and information related to the lateral position of the forward obstacle in the lateral direction (width direction). The lateral position of the forward obstacle may be calculated based on a center position of a pixel group related to the forward obstacle in the lateral direction. Alternatively, the lateral position of the forward obstacle may be calculated as a range between a left end lateral position and a right end lateral Position. The information (detection result) obtained by the image sensor may be transmitted to the processing device 10 at a predetermined frame cycle. It is noted that the image processing function of the image processor (a function of calculating a position of the forward obstacle, for example) may be implemented by the control apparatus 10.

The control device 10 is coupled to vehicle wheel speed sensors 138FR, 138FL, 138RR and 138RL that are provided in wheels of the vehicle, respectively. The vehicle wheel speed sensors 138FR, 138FL, 138RR and 138RL may be of an active type or a passive type.

The control device 10 is coupled to the hydraulic circuit 200. The control device 10 controls the brake forces applied to the wheels 100FL, 100FR, 100RL and 100RR by controlling valves, etc., provided in the hydraulic circuit 200. The configuration of the hydraulic circuit 200 may be arbitrary as long as an automatic brake control described hereinafter can be implemented. For example, the hydraulic circuit 200 includes a pump and an accumulator to generate high pressure oil. At the time of the automatic brake control, valves 3n such, as a master cylinder cut solenoid valve, the pump, etc., are controlled to increase wheel cylinder pressures of wheel cylinders 224FL, 224FR, 224RL and 224RR. Further, such an oil hydraulic circuit that is typically used in a brake-by-wire system such as an ECS (Electric Control Braking system) may be adapted as the hydraulic circuit 200.

Figure 2:
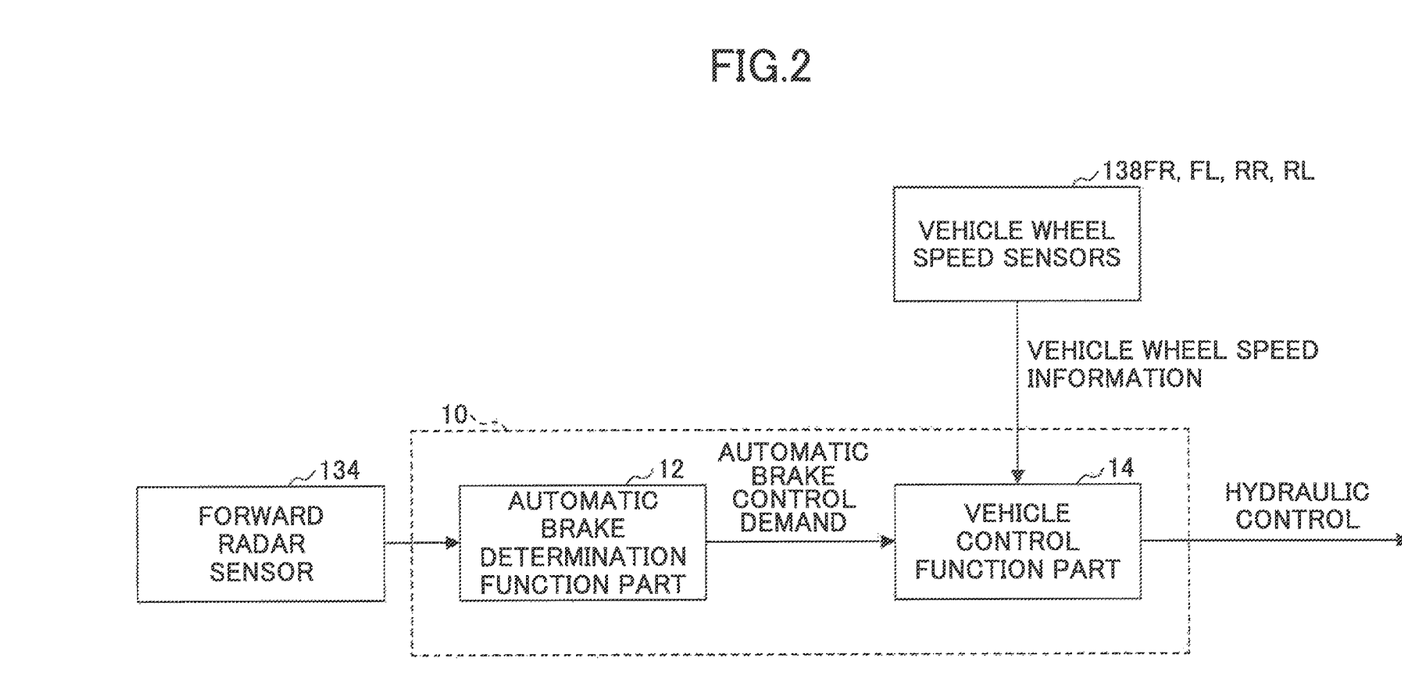
FIG. 2 is a diagram illustrating an example of a function of a control device 10.

FIG. 2 is a diagram illustrating an example of a function configuration of the control device 10.

The control device 10 includes an automatic brake determination function part 12 and a vehicle control function part 14, as illustrated in FIG. 2.

The automatic brake determination function part 12 determines, based on information from the forward radar sensor 134, whether an automatic brake control start condition is met. The automatic brake determination function part 12 outputs an automatic brake control demand when the automatic brake control start condition is met. The automatic brake control start condition is arbitrary. For example, in the case of a collision prevention control with respect to the forward obstacle, a TTC (Time to Collision) that corresponds to a time before the predicted collision with the forward obstacle is calculated, and the automatic brake control start condition is met when the calculated TTC becomes less than a predetermined time (1 second, for example). In this case, the control device 10 calculates, based on the detection result from the forward radar sensor 134, the TTC with respect to the forward obstacle within a predetermined direction range (i.e., the lateral position range), and outputs the automatic brake control demand when the calculated TTC becomes less than a predetermined time (1 second, for example). It is noted that the TTC may be derived by dividing the relative distance to the forward obstacle by the relative speed with respect to the forward obstacle. Further, in the case of an autonomous drive control, the automatic brake control start condition may be met when the deceleration, which is required to keep the distance to the preceding vehicle smaller than a lower limit of a predetermined inter-vehicle distance, has a magnitude greater than a predetermined value.

Further, the automatic brake control start condition may be met when it is determined that the collision with the forward obstacle (including the preceding vehicle) is inevitable. In other words, the automatic brake control start condition may be met when a probability of the collision with the forward obstacle is greater than or equal to a predetermined level (100%, in this case). A way of determining whether the collision with the forward obstacle is inevitable is well-known in the field of a pre-collision safety, and there are various ways. Any way may be used. For example, relative speed at which the collision can be prevented may be calculated in advance on an automatic brake control start timing basis (i.e., a TTC basis), and collision inevitable determination mapped data may be generated based on the calculated relative speeds. In this case, the control device 10 may refer to the collision inevitable determination mapped data, based on the relative speed and the TTC with respect to the forward obstacle, to determine whether the collision with the forward obstacle is inevitable. Specifically, a deceleration G (m/s$^2$) and a decelerated speed V (m/s) after t seconds from the start of the automatic brake control can be expressed by the following relationship, assuming a maximum deceleration $G_{MAX}$ (m/s$^2$) and a deceleration gradient J (m/s$^3$).

$$G=Jt, \; V=J t^2/2,$$

when t is less than or equal to $G_{MAX}/J$.

$$G=G_{MAX}, \; V=G_{MAX}^2/(2J)+G_{MAX}(t-G_{MAX}/J),$$

when t is greater than $G_{MAX}/J$.

In this case, the collision inevitable determination mapped data may be generated by regarding the relative speed, which is greater than the decelerated speed V after t seconds, as a relative speed at which the collision is inevitable. Alternatively, collision inevitable determination mapped data using the relative speed as a parameter may be generated. In this case, the relative speed is determined by integrating the decelerated speed V. Alternatively, a more complex algorithm that uses the acceleration of the forward obstacle, etc., may be used.

Once the automatic brake control start condition is met, the automatic brake determination function part 12 continues to output the automatic brake control demand until an automatic brake control end condition is met. The automatic brake control end condition is arbitrary. For example, the automatic brake control end condition may be met when the vehicle body speed becomes 0 km/h, the TTC exceeds 1.5 [second], an operation of the brake pedal 190 by the driver is detected, the automatic brake control demand continues for a predetermined time (3 second, for example), etc.

Basically, the vehicle control function part 14 executes automatic brake control in response to the automatic brake control demand from the automatic brake determination function part 12. The automatic brake control is performed to increase the wheel cylinder pressures of the wheel cylinders 224FL, 224FR, 224RL and 224RR under a situation where the operation of the brake pedal 190 by the driver is not performed, for example. Thus, the target control value of the automatic brake control may be determined based on factors other than an operation amount of the brake pedal 190. The target control value may be a fixed value or a variable. Further, in the case of the fixed value, the fixed value may be varied according to the lapse of time. Further, the target control value may be varied according to the vehicle speed at the time of starting the automatic brake control. It is noted that the target control value may be defined by any physical quantities such as a deceleration, a hydraulic pressure, a gradient of an increase of the hydraulic pressure, etc. The target control value may be determined by the vehicle control function part 14 or may be determined by the automatic brake determination function part 12. In the case where the target control value is determined by the automatic brake determination function part 12, the target control value including the automatic brake control demand may be supplied to the vehicle control function part 14.

It is noted that the way of performing the automatic brake control is arbitrary. For example, the same target control value may be equally applied to the wheel cylinders 224FL, 224FR, 224RL and 224RR of four wheels, or different target control values (the target control value for the front wheels is different from that for the rear wheels, for example) for considering a behavior of the vehicle at the time of the sudden brake may be applied.

During the automatic brake control, the vehicle control function part 14 suppresses the automatic brake control, if necessary, in terms of reducing a risk related to the following vehicle (the risk of the following vehicle that may bump into the back of the host vehicle due to the automatic brake control in the host vehicle). This is because there may be a case due to abnormality in the automatic brake determination function, part 12, the forward radar sensor 134, etc., for example, where the automatic brake control is not performed in a desirable manner.

Specifically, during the automatic brake control, the vehicle control function part 14 determines, based on an automatic brake duration time and a vehicle speed reduction amount (decelerated speed) whether to suppress the automatic brake control. The automatic brake duration time is from the automatic brake control starting timing to a current time point. The vehicle speed reduction amount is a value obtained by subtracting a vehicle speed (referred to as "a control start vehicle body speed", hereinafter) at the current time point from the vehicle, speed (referred to as "a current vehicle body speed", hereinafter) at the automatic brake control starting timing. In this case, the vehicle control function part 14 may set an upper guard value based on parameters including the automatic brake duration time and the control start vehicle body speed, and suppress the automatic brake control when the vehicle speed reduction amount exceeds the upper guard value.

In order to consider the risk of the following vehicle, the upper guard value may be set based on the parameters including the automatic brake duration time and the control start vehicle body speed such that the risk of the following vehicle becomes smaller. Basically, the upper guard value may be set such that the upper guard value becomes smaller as the risk of the following vehicle becomes higher. It is noted that the risk of the following vehicle may be evaluated in various ways. In this case, the fact that a severity of a rear-end collision is determined according to a collision speed is considered such that the vehicle speed reduction amount (i.e., the reduced amount of the speed of the vehicle which the following vehicle will bump) is a possible cause of the rear-end collision if it is assumed that the following vehicle travels at the same speed as the vehicle which the following vehicle will bump.

On the other hand, it is better for the upper guard value not to obstruct the automatic brake control when the automatic brake control is performed in a desired manner (i.e., there is no abnormality in the automatic brake determination function part 12, the forward radar sensor 134, etc.). Thus, the upper guard value may be set such that the upper guard value is greater than a maximum value of a range of the vehicle speed reduction amount that is possibly implemented when the automatic brake control is performed in the desired manner.

In this way, according to the embodiment, when the vehicle speed reduction amount exceeds the upper guard value, the automatic brake control is suppressed. With this arrangement, when the automatic brake control is not performed in the desired manner due to the abnormality in the automatic brake determination function part 12, the forward radar sensor 134, etc., the automatic brake control operating in the undesired manner can be suppressed. Thus, the risk of the following vehicle (and the risk of the host vehicle being bumped into) can be reduced. Specifically, the risk of the rear-end collision by the following vehicle that could occur due to the sudden deceleration by the automatic brake control is monitored based on the relationship between the vehicle speed reduction amount and the upper guard value Vth, and the automatic brake control is suppressed when the vehicle speed reduction amount exceeds the upper guard value Vth, which can reduce the risk of the rear-end collision by the following vehicle.

According to the embodiment, the following vehicle is not directly monitored with a rear radar, etc., and the risk of the rear-end collision by the following vehicle is evaluated with the vehicle speed reduction amount. In the case of a configuration in which the following vehicle is directly monitored with a rear radar, etc., the risk of the rear-end collision by the following vehicle can be determined with high accuracy; however, an additional device such as a rear radar, etc., is necessary, which is disadvantageous in terms of the cost. In contrast, according to the embodiment, since the following vehicle is not directly monitored with a rear radar, etc., it becomes possible to implement, with reduced cost, a configuration in which the automatic brake control is suppressed according to the rear-end collision risk of the following vehicle.

According to the embodiment, the rear-end collision risk of the following vehicle is not evaluated with an instantaneous deceleration, and, instead of it, the rear-end collision risk of the following vehicle is not evaluated with the vehicle speed reduction amount over a time period that has a length to some extent (i.e., the vehicle speed reduction amount from the timing of starting the automatic brake control). Thus, the rear-end collision risk of the following vehicle can be evaluated with high accuracy by reducing the influence due to the instantaneous steep change (variations due to vibration or impulse components resulted from a road state, etc., for example). Therefore, it becomes possible to increase the reliability of the suppression of the automatic brake control.

Figure 3:
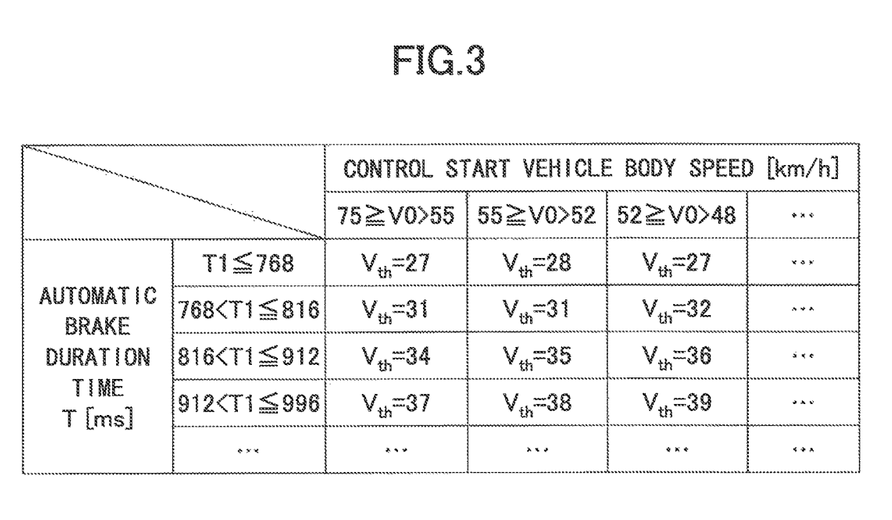
FIG. 3 is a table illustrating an example of a relationship between an automatic brake duration time, a control start vehicle body speed, and an upper guard value.

FIG. 3 is a table illustrating an example of a relationship between the automatic brake duration time, the control start vehicle body speed, and the upper guard value. In FIG. 3, the automatic brake duration time is expressed with a symbol T1, the control start vehicle body speed is expressed with a symbol V0, and the upper guard value is expressed with a symbol Vth.

As illustrated in FIG. 3, the upper guard value Vth may be set in relation with the automatic brake duration time T1 and the control start vehicle body speed V0. In the example illustrated in FIG. 3, the upper guard value Vth is set such that the upper guard value Vth becomes greater as the automatic brake duration time T1 increases. This is because the vehicle speed reduction amount increases as the automatic brake duration time T1 increases, and thus the rear-end collision risk increases as the automatic brake duration time T1 increases. On the other hand, the upper guard value Vth may be set such that the upper guard value Vth becomes greater as the control start vehicle body speed V0 becomes greater, but this tendency is not indispensable. This is because the magnitude of the control start vehicle body speed V0 is not necessarily correlated with the rear-end collision risk in a one-to-one relationship, and the rear-end collision risk is influenced by an inter-vehicle distance at the time of starting the automatic brake control. For example, an ideal relationship between the vehicle speed and the inter-vehicle distance is such that the inter-vehicle distance becomes longer as the vehicle speed becomes greater; however, there may be a case where such an ideal relationship is not implemented in practice.

It is noted that the vehicle control function part 14 may hold such mapped data as illustrated in FIG. 3, and refer to the mapped data to set the upper guard value according to the automatic brake duration time and the control start vehicle body speed. Such mapped data may be generated for each factor that has influence on the rear-end collision risk of the following vehicle. It is noted that the mapped data may be stored in the ROM, etc., of the control device 10.

It is noted that, in the example illustrated in FIG. 3, the upper guard value Vth changes in stages according to the change in the automatic brake duration time T1 as well as the change in the control start vehicle body speed V0. In other words, the upper guard value does not change linearly but in stages. For example, in the case of the control start vehicle body speed V0 being equal to 70 (i.e., 55<V0<=75), the upper guard value Vth changes in stages, such as Vth=27 where the automatic brake duration time T1 is less than or equal to 768, Vth=31 where the automatic brake duration time T1 is greater than 768 and less than or equal to 816, and so on. Similarly, for example, in the case of the automatic brake duration time T1 being equal to 760 T1<=768), the upper guard value Vth changes in stages, such as Vth=27 where the control start vehicle body speed V0 is greater than 55 and less than or equal to 75, Vth=28 where the control start vehicle body speed V0 is greater than 52 and less than or equal to 55, and so on. However, these relationships may be defined with smaller width (resolution). For example, the upper guard value Vth may be changed linearly according to the change in the automatic brake duration time T1, and may be changed linearly according to the change in the control start vehicle body speed V0.

Further, the upper guard value Vth (m/s) may be calculated based on the following calculation formula, using the automatic brake duration time T1 (s).

$$Vth = Gc \times T1 \qquad \text{formula (1)}$$

Here, Gc (m/s$^2$) is an upper guard deceleration, and may have different values according to the control start vehicle body speed V0. In this case, mapped data of the upper guard deceleration Gc with respect to the control start vehicle body speed VU as a parameter may be stored.

Alternatively, the upper guard value Vth (m/s) may be calculated based on the following calculation formula, using the automatic brake duration time T1 (s) and a deceleration gradient J (m/s$^3$).

$$Vth = J \times t^2/2,$$

where T1 is less than or equal to Gc/J $$Vth = Gc^2/(2J) + Gc(T1 - Gc/J), \qquad \text{formula (2)}$$

when T1 is greater than Gc/J.

Here, similarly, the upper guard deceleration Gc (m/s$^2$) may have different values according to the control start vehicle body speed V0. In this case, mapped data of the upper guard deceleration Go with respect to the control start vehicle body speed V0 as a parameter may be stored.

Figure 4:
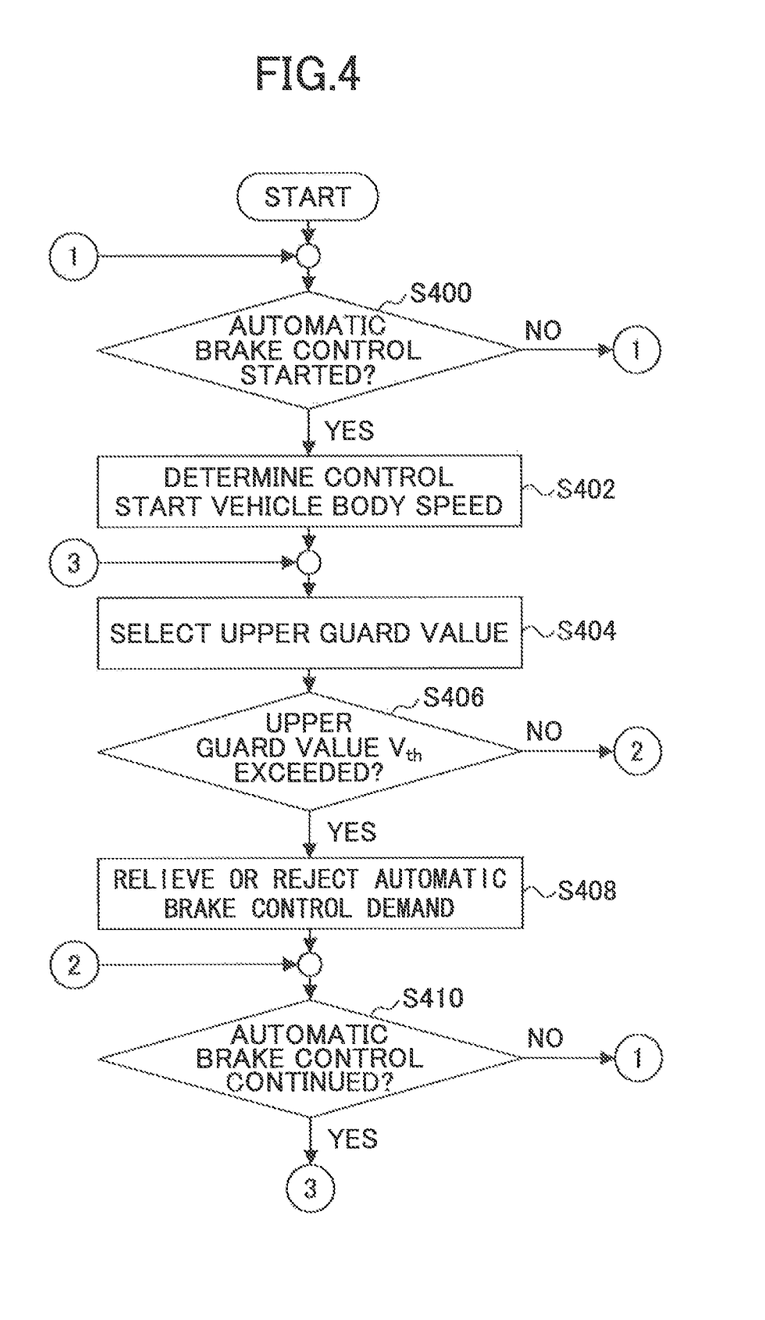
FIG. 4 is a flowchart illustrating an example of a process executed by a vehicle control function part 14.

FIG. 4 is an example of a flowchart of a process executed by the vehicle control function part 14. The process routine illustrated in FIG. 4 may be performed repeatedly at a predetermined cycle during the ON state of the ignition switch, for example.

In step S400, it is determined whether the automatic brake control is started. The vehicle control function part 14 starts the automatic brake control when the vehicle control function part 14 receives the automatic brake control demand from the automatic brake determination function part 12 under a situation where the vehicle control function part 14 has not received the automatic brake control demand from the automatic brake determination function part 12. When the automatic brake control is started, a timer for measuring the automatic brake duration time T1 is started, and the process routine goes to step S402. When the automatic brake control is not started, a state for waiting for the start of the automatic brake control (i.e., a state for waiting for the timing of the automatic brake control start condition being met) is formed.

In step S402, the vehicle speed at the current time point (i.e., at the time of starting the automatic brake control) is determined as a control start vehicle body speed V0. It is noted that the vehicle speed at the current time point may be calculated (estimated) based on the information from the vehicle wheel speed sensors 138FR, 138FL, 138RR and 138RL, for example, or may be calculated based on other information (the rpm of the output shaft of the transmission, for example).

In step S404, the upper guard value Vth is selected (set). Specifically, the upper guard value Vth is set according to the control start vehicle body speed V0 and the automatic brake duration time T1 at the current time point. The upper guard value Vth may be selected (calculated) by referring to such mapped data as illustrated in FIG. 3, or may be calculated based on the upper guard deceleration Go according to the control start vehicle body speed V0 using the formula (1) or the formula (2) described above.

In step S406, it is determined whether the vehicle speed reduction amount at the current time point exceeds the upper guard value Vth set in step S404 described above. The vehicle speed reduction amount at the current time point may be calculated by subtracting the vehicle speed at the current time point (i.e., the current vehicle body speed) from the control start vehicle body speed V0 obtained in step S402 described above. Similarly, the current vehicle body speed may be calculated (estimated) based on the information from the vehicle wheel speed sensors 138FR, 138FL, 138RR and 138RL, for example, or may be calculated based on other information (the rpm of the output shaft of the transmission, for example). If it is determined that the vehicle speed at the current time point exceeds the upper guard value Vth, the process routine goes to step S408, otherwise (i.e., the vehicle speed reduction amount at the current time point is less than or equal to the upper guard value Vth) the process routine skips step S408 to go to step S410.

In step S408, the automatic brake control demand is relieved or rejected. Relieving the automatic brake control demand includes reducing the brake force by the automatic brake control while the automatic brake control is continued. The reduction of the brake force by the automatic brake control may be implemented by correcting the target control value. In this case, the brake force (i.e., the target control value) by the automatic brake control may be reduced constantly by a predetermined amount or a predetermined percentage (50%, for example). Alternatively, the brake force (i.e., the target control value) by the automatic brake control may be reduced by a reduction amount corresponding to an amount that exceeds the upper guard value Vth of the vehicle speed reduction amount. For example, the brake force by the automatic brake control may be reduced such that the reduction amount becomes greater as the amount that exceeds the upper guard value Vth of the vehicle speed reduction amount becomes greater. On the other hand, rejecting the automatic brake control demand may include stopping (canceling) the automatic brake control. It is noted that stopping the automatic brake control is equivalent to correcting the target control value such that the brake force by the automatic brake control becomes 0.

In step S410, it is determined whether the automatic brake control is continued. When the automatic brake control demand from the automatic brake determination function part 12 is still received, it is determined that the automatic brake control is continued, and thus the process routine returns to step S404. In this case, the process from step S404 is performed based on the updated automatic brake duration time T1 and the updated vehicle speed reduction amount at the next process cycle. On the other hand, when the automatic brake control is not continued, the process routine returns to step S400. It is noted that, in the case of rejecting the automatic brake control demand in step S408, the automatic brake control is not continued, and thus the process routine returns to step S400. In this case, the determination result of step S400 does not become affirmative (because the automatic brake control demand is continuously received).

According to the process illustrated in FIG. 4, when the vehicle speed reduction amount exceeds the upper guard value Vth, the automatic brake control demand is relieved or rejected. Thus, when the automatic brake control is not performed in the desired manner due to the abnormality in the automatic brake determination function part 12, the forward radar sensor 134, etc., a continuous execution of the automatic brake control in the undesired manner can be suppressed. Thus, the risk of the following vehicle (and the risk of the host vehicle being bumped into) can be reduced. Specifically, the risk of the rear-end collision by the following vehicle that could occur due to the sudden deceleration by the automatic brake control is monitored based on the relationship between the vehicle speed reduction amount and the upper guard value Vth, and the automatic brake control is suppressed when the vehicle speed reduction amount exceeds the upper guard value Vth, which can reduce the risk of the rear-end collision by the following vehicle.

Next, as a second embodiment, a configuration in which the automatic brake control is performed in two stages is described. It is noted that in the following the embodiment described above is referred to as "the first embodiment" for the sake of a distinction. According to the first embodiment, the automatic brake control is performed such that a necessary brake force is generated from the beginning of the automatic brake control; however, according to the second embodiment, the automatic brake control is performed such that a gentle brake force is generated at first and the necessary brake force is generated afterward. Specifically, the automatic brake control includes a preliminary brake control that is to be performed prior to a primary automatic brake control. In this case, the primary automatic brake control corresponds to the automatic brake control in the first embodiment described above. Thus, a condition to be met to start the primary automatic brake control may be the same as the automatic brake control start condition in the first embodiment described above. A condition to be met to start the preliminary brake control may be more relieved (i.e., easier to be met) than the condition to be met to start the primary automatic brake control. In this case, the automatic brake determination function part 12 outputs the preliminary brake control demand when the condition to be met to start the preliminary brake control is met, and then outputs the automatic brake control demand when the condition to be met to start the primary automatic brake control is met.

Typically, the preliminary brake control is performed to prevent the rear-end collision by the following vehicle by turning on brake lamps to call attention to the following vehicle (for informing the driver of the following vehicle of a situation where a sudden brake may be performed). Thus, the preliminary brake control may generate the minimum brake force that causes the brake lamps to be turned on. It is noted that the brake lamps are turned on at the time of the preliminary brake control and the primary automatic brake control. In this case, the brake lamps may be tuned on at the time of the preliminary brake control and/or the primary automatic brake control in an ordinary manner that is implemented at the time of the operation of the brake pedal, or the brake lamps may be tuned on at the time of the preliminary brake control and/or the primary automatic brake control in another manner such that the brake lamps are flashed on and off, etc.

A condition to be met to end the preliminary brake control is arbitrary. For example, the condition may be met when the condition to be met to start the primary automatic brake control is met, the operation of the brake pedal 190 is detected, the preliminary brake control demand continues for a predetermined time, etc.

Figure 5:
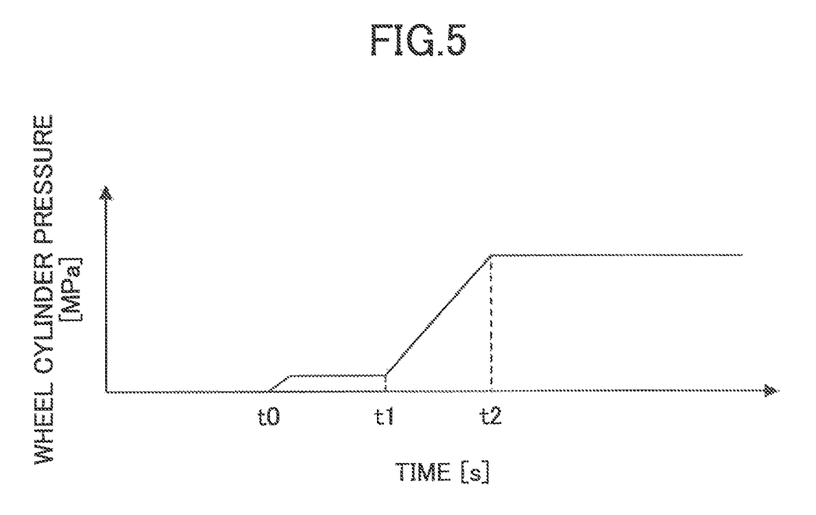
FIG. 5 is a timing diagram illustrating an example of a preliminary brake control and a primary automatic brake control.

FIG. 5 is a timing diagram illustrating an example of the preliminary brake control and the primary automatic brake control. In FIG. 5, a lateral axis indicates time, and a vertical axis indicates a wheel cylinder pressure. It is noted that the wheel cylinder pressure may be considered as an instruction value or an actual value. Further, the wheel cylinder pressure may be considered as the wheel cylinder pressure of any one of the wheel cylinders 224FL, 224FR, 224RL and 224RR.

In the example illustrated in FIG. 5, at time point t0, the condition to be met to start the preliminary brake control is met, and thus the preliminary brake control is started. In other words, the wheel cylinder pressure is increased and thus the brake force is automatically generated. At that time, the brake force may have minimum magnitude that is required to turn on the brake lamps, or magnitude that causes the deceleration that the driver can feel in order to call attention to the driver. Afterward, at time point t1, the condition to be met to start the primary automatic brake control is met, and thus the primary automatic brake control is started. In other words, the wheel cylinder pressure is steeply increased and thus a great brake force is automatically generated. At that time, the brake force may have magnitude that can prevent the collision with the forward obstacle, for example. It is noted that, in the example illustrated in FIG. 5, at time point t1, the primary automatic brake control is started, and at time point t2, the wheel cylinder pressure is increased to a predetermined value (i.e., the target control value) and kept at that value.

In the second embodiment, during the automatic brake control, the vehicle control function part 14 determines, based on an automatic brake duration time, a preliminary brake control duration time and a vehicle speed reduction amount. (decelerated speed) whether to suppress be automatic brake control. The automatic brake duration time is from the timing of starting the primary automatic brake control to a current time point. The preliminary brake control duration time is from the timing of starting the preliminary brake control to the timing of starting the primary automatic brake control. The vehicle speed reduction amount is a value obtained by subtracting the vehicle speed (i.e., the control start vehicle body speed) at the current time point from the vehicle speed (i.e., the current vehicle body speed) at the timing of starting the primary automatic brake control. In this case, the vehicle control function part 14 may set an upper guard value based on parameters including the automatic brake duration time, the preliminary brake control duration time and the control start vehicle body speed, and suppress the automatic brake control when the vehicle speed reduction amount exceeds the upper guard value.

The upper guard value may be set based on the parameters including the automatic brake duration time, the preliminary brake control duration time and the control start vehicle body speed such that the risk of the following vehicle is considered. Basically, the upper guard value may be set such that the upper guard value becomes smaller as the risk of the following vehicle becomes higher. Here, the preliminary brake control duration time is included the parameters, in addition to the automatic brake duration time and the control start vehicle body speed, to determine the upper guard value. The preliminary brake control duration time corresponds to a period during which the brake lamps are turned on before the timing of starting the primary automatic brake control. The longer the period during which the brake lamps are turned on becomes, the higher the probability that the driver of the following vehicle notices the braking of the forward vehicle becomes (and thus the driver's attention to the movement of the forward vehicle becomes higher, which in turn increases the probability that the driver can respond to the possibly subsequent sudden brake), and thus the rear-end collision risk is reduced. Thus, typically, the upper guard value may be varied such that the upper guard value becomes greater as the preliminary brake control duration time becomes longer. For example, in the case where the upper guard value is calculated using the formula (1) or (2) described above, the upper guard deceleration Gc may be varied such that the upper guard deceleration Go becomes greater as the preliminary brake control duration time becomes longer.

Figure 6:
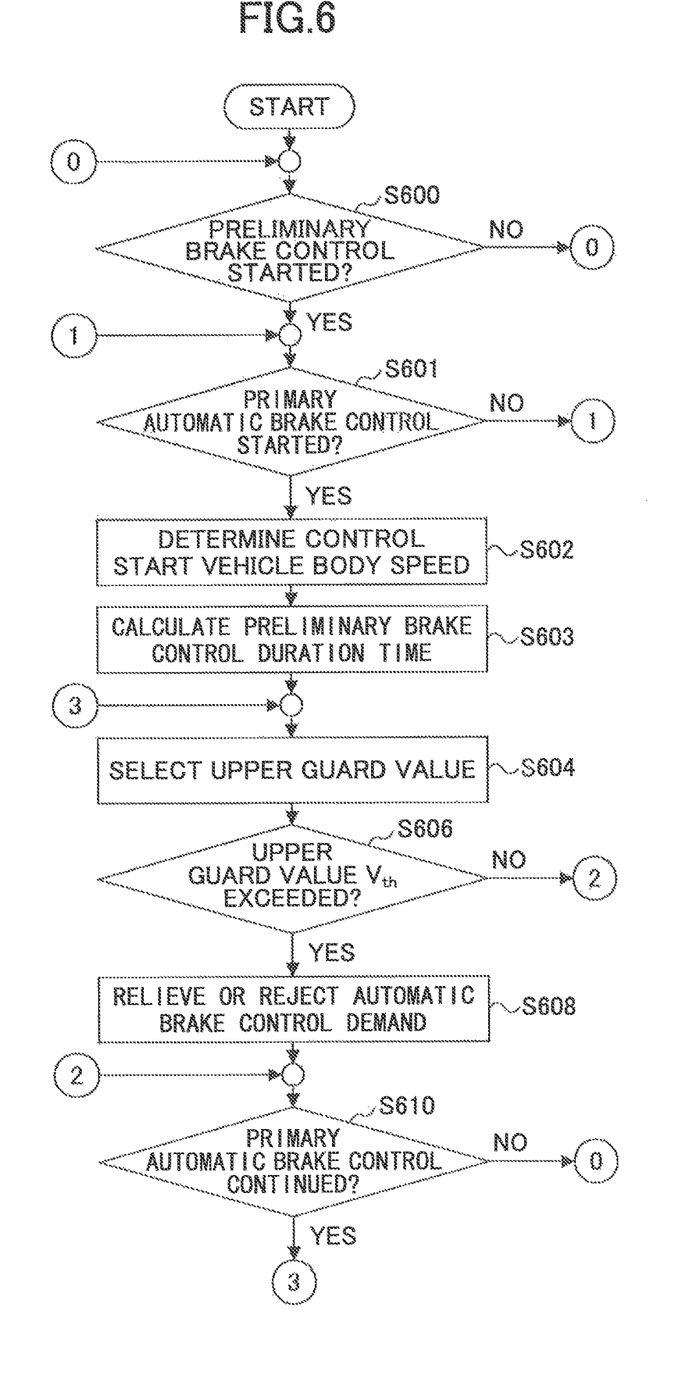
FIG. 6 is a flowchart illustrating an example of a process executed by a vehicle control function part 14 in a second embodiment.

FIG. 6 is a flowchart illustrating an example of a process executed by a vehicle control function part 14 in a second embodiment. The process routine illustrated in FIG. 6 may be performed repeatedly at a predetermined cycle during the ON state of the ignition switch, for example.

In step S600, it is determined whether the preliminary brake control is started. The vehicle control function part 14 starts the preliminary brake control when the vehicle control function part receives the preliminary brake control demand from the automatic brake determination function part 12 under a situation where the vehicle control function part 14 has not received the preliminary brake control and the automatic brake control demand from the automatic brake determination function part 12. When the preliminary brake control is started, a timer for measuring the preliminary brake control duration time T0 is started, and the process routine goes to step S601. When the preliminary brake control is not started, a state for waiting for the start of the preliminary brake control (i.e., a state for waiting for the timing of the preliminary brake control start condition being met) is formed.

In step S601, it is determined whether the primary automatic brake control is started. The vehicle control function part 14 starts the primary automatic brake control when the vehicle control function part 14 receives the automatic brake control demand from the automatic brake determination function part 12 under a situation where the vehicle control function part 14 has not received the automatic brake control demand from the automatic brake determination function part 12. It is noted that the vehicle control function part 14 may start the automatic brake control when the preliminary brake control demand and the automatic brake control demand are received simultaneously under a situation (i.e., when the condition to be met to start the preliminary brake control and the condition to be met to start the primary automatic brake control are met simultaneously for the first time due to a sudden interrupt by the forward vehicle, for example) where the vehicle control function part 14 has not received the preliminary brake control demand and the automatic brake control demand from the automatic brake determination function part 12 (in this case, the preliminary brake control duration time T0 is equal to 0). When the primary automatic brake control is started, a timer for measuring the automatic brake duration time T1 is started, and the process routine goes to step S602. When the primary automatic brake control is not started, a state for waiting for the start of the automatic brake control (i.e., a state for waiting for the timing of the automatic brake control start condition being met) is formed.

In step S602, the vehicle speed at the current time point (i.e., at the time of starting the primary automatic brake control) is determined as a control start vehicle body speed V0. It is noted that the vehicle speed at the current time point may be calculated (estimated) based on the information from the vehicle wheel speed sensors 138FR, 138FL, 138RR and 138RL, for example, or may be calculated based on other information (the rpm of the output shaft of the transmission, for example).

In step S603, the preliminary brake control duration time T0 is calculated (confirmed). The preliminary brake control duration time T0 corresponds to a time from the timing of starting the preliminary brake control to the timing of starting the primary automatic brake control. The preliminary brake control duration time T0 may be measured with a timer that is started at the timing of starting the preliminary brake control.

In step S604, the upper guard value Vth is selected (set). Specifically, the upper guard value Vth is set according to the control start vehicle body speed V0, the preliminary brake control duration time T0, and the automatic brake duration time T1 at the current time point. For example, the upper guard value Vth may be selected (calculated) by referring to such mapped data as illustrated in FIG. 3. In this case, such mapped data as illustrated in FIG. 3 may be generated for a plurality of values of the preliminary brake control duration time T0. Further, the upper guard value Vth may be calculated using the formula (1) or (2) described above. In this case, mapped data that defines the upper guard deceleration Gc based on the parameters including the control start vehicle body speed V0 and the preliminary brake control duration time T0 may be used.

In step S606, as is the case with step S406 in FIG. 4 described above, it is determined whether the vehicle speed reduction amount at the current time point exceeds the upper guard value Vth set in step S604 described above. The vehicle speed reduction amount at the current time point may be calculated by subtracting the current vehicle body speed from the control start vehicle body speed V0 obtained in step S602 described above. If it is determined that the vehicle speed at the current time point exceeds the upper guard value Vth, the process routine goes to step S608, otherwise (i.e., the vehicle speed reduction amount at the current time point is less than or equal to the upper guard value Vth) the process routine skips step S608 to go to step S610.

In step S608, as is the case with step S408 in FIG. 4 described above, the automatic brake control demand is relieved or rejected.

In step S610, it is determined whether the primary automatic brake control is continued. When the automatic brake control demand from the automatic brake determination function part 12 is still received, it is determined that the primary automatic brake control is continued, and thus the process routine returns to step S604. In this case, the process from step S604 is performed based on the updated automatic brake duration time T1 and the updated vehicle speed reduction amount at the next process cycle. On the other hand, when the automatic brake control is not continued, the process routine returns to step S600. It is noted that, in the case of rejecting the automatic brake control demand in step S608, the primary automatic brake control is not continued, and thus the process routine returns to step S600.

According to the process illustrated in FIG. 6, as is the case with the process illustrated in FIG. 4, when the vehicle speed reduction amount exceeds the upper guard value Vth, the automatic brake control demand is relieved or rejected. With this arrangement, when the primary automatic brake control is not perform in the desired manner due to the abnormality in the automatic brake determination function part 12, the forward radar sensor 134, etc., the primary automatic brake control in the undesired manner can be suppressed. Thus, the risk of the following vehicle (and the risk of the host vehicle being bumped into) can be reduced.

Further, according to the process illustrated in FIG. 6, since the upper guard value Vth is set according to the preliminary brake control duration time T0, the risk of the following vehicle that may be varied according to the preliminary brake control duration time T0 can be considered. In other words, since the upper guard value Vth is set such that the upper guard value Vth becomes greater as the preliminary brake control duration time T0 becomes longer, it becomes possible to suppress the automatic brake control in such a manner that the reduced risk of the following vehicle due to the preliminary brake control is considered.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the embodiments, the automatic brake determination function part 12 and the vehicle control function part 14 may be implemented by the same ECU or separate ECUs. For example, the automatic brake determination function part 12 may be implemented by a pre-collision safety ECU that performs a pre-collision control, and the vehicle control function part 14 may be implemented by a brake control ECU. Alternatively, the function of the vehicle control function part 14 may be incorporated in the pre-collision safety ECU and the brake control ECU, respectively, in order to increase reliability with more redundancy. In this case, the vehicle control function part 14 in the pre-collision safety ECU may demand only the relief of the automatic brake control demand, among the relief and the rejection of the automatic brake control, and the vehicle control function part 14 in the brake control ECU may perform only the rejection of the automatic brake control, among the relief and the rejection of the automatic brake control. In this case, it becomes possible to give the highly reliable brake control ECU a significant function of rejecting the automatic brake control (i.e., the function to be implemented with high reliability).

Further, in the embodiments described above, the automatic brake control demand is relieved or rejected according to the automatic brake duration time T1; however, only the relief of the automatic brake control may be implemented or only the rejection of the automatic brake control may be implemented.

Further, in the embodiments, the upper guard value Vth (or the upper guard deceleration Go) is selected based on the parameter including the control start vehicle body speed V0; however, the upper guard value Vth (or the upper guard deceleration Gc) may be selected based on the parameter including the vehicle body speed after the timing of starting the control. For example, the mapped data illustrated in FIG. 3 (or the mapped data for the upper guard deceleration Gc) may be switched to new mapped data at a predetermined timing after the timing of starting the automatic brake control. The predetermined time point may be arbitrary, such as a timing when the current vehicle body speed becomes a predetermined speed, a timing when the vehicle speed reduction amount becomes a predetermined value, a timing when the automatic brake duration time T1, a timing when the TTC becomes a predetermined value, etc. In this case, the automatic brake duration time T1 and the control start vehicle body speed V0 may be reset at a timing of changing the mapped data. In other words, in the mapped data illustrated in FIG. 3, the automatic brake duration time T1 represents the duration time of the automatic brake control after the timing of changing the mapped data, and the control start vehicle body speed V0 represents the vehicle body speed at the timing of changing the mapped data.

Further, in the embodiments described above, the automatic brake control demand is relieved or rejected in the automatic brake control; however, in the case of performing the automatic acceleration control, the automatic acceleration control demand may be relieved or rejected. Also in this case, the automatic acceleration control demand may be relieved or rejected based on the control start vehicle body speed V0, the vehicle speed increase amount (i.e., the value obtained by subtracting the control start vehicle body speed VU from the current vehicle body speed), and the upper guard value.

Further, according to the embodiment, whether to relieve or reject the automatic brake control demand is determined by comparing the vehicle speed reduction amount with the upper guard value Vth. However, an upper guard value related to the automatic brake duration time may be set based on the parameters including the vehicle speed reduction amount and the control start vehicle body speed V0, and the automatic brake control demand may be relieved or rejected when the automatic brake duration time exceeds the set upper guard value.

Further, according to the embodiments, during the automatic brake control, the automatic brake control is suspended (canceled) when the brake pedal 190 is operated by the driver. However, during the automatic brake control, when the brake pedal 190 is operated by the driver, the automatic brake control may be maintained until the target control value according to the operation of the brake pedal 190 exceeds the target control value by the automatic brake control.

DESCRIPTION OF REFERENCE SYMBOLS 1 vehicle brake apparatus
10 control device
12 automatic brake determination function part
14 vehicle control function part
100FL left front wheel
100FR right front wheel
100RL left rear wheel
100RR right rear wheel
134 forward radar sensor
190 brake pedal
200 hydraulic circuit
202 master cylinder
224FL, FR, RL, RR wheel cylinders

The invention claimed is:

1. A vehicle speed control apparatus comprising:
a non-transitory computer-readable medium storing instructions; and
a processor that is programmed to execute the instructions to:
generate a control signal to start an automatic brake control;
calculate, after starting the automatic brake control, a vehicle speed reduction amount and an automatic brake duration time;
determine, based on the automatic brake duration time and the vehicle speed reduction amount, whether to suppress a brake force of the automatic brake control; and
suppress the brake force based on the determining whether to suppress the brake force of the automatic brake control,
the automatic brake duration time being from an automatic brake control starting timing to a current time point,
the vehicle speed reduction amount corresponding to a value obtained by subtracting a vehicle speed at the current time point from the vehicle speed at the automatic brake control starting timing.

2. The vehicle speed control apparatus of claim 1, wherein the processor is further programmed to set an upper limit value based on parameters including the automatic brake duration time and the vehicle speed at the automatic brake control starting timing, and suppresses the brake force due to the automatic brake control when the vehicle speed reduction amount exceeds the upper limit value.

3. The vehicle speed control apparatus of claim 1, further comprising:
a storage part that stores mapped data that defines the upper limit value based on the parameters including the automatic brake duration time and the vehicle speed at the automatic brake control starting timing,
wherein the mapped data has the upper limit value gradually changed according to a change in the automatic brake duration time and a change in the vehicle speed at the automatic brake control starting timing.

4. The vehicle speed control apparatus of claim 1, wherein the automatic brake control includes a primary automatic brake control, and a preliminary brake control to be performed prior to the primary automatic brake control to generate the brake force that is smaller than that at the time of the preliminary brake control, and
the automatic brake duration time is calculated as a time from a timing of starting the primary automatic brake control to the current time point.

5. The vehicle speed control apparatus of claim 4, wherein the processor is further programmed to set the upper limit value based on parameters including the automatic brake duration time, the vehicle speed at the timing of starting the primary automatic brake control, and a time from a timing of starting the preliminary brake control to the timing of starting the primary automatic brake control.

6. The vehicle speed control apparatus of claim 1, wherein when the automatic brake duration time is less than or equal to a predetermined value, the processor is further programmed to suppress the brake force due to the automatic brake control to a value greater than 0 upon the vehicle speed reduction amount exceeding the upper limit value; and when the automatic brake duration time is greater than the predetermined value, the processor is further programmed to suppress the brake force due to the automatic brake control to 0 upon the vehicle speed reduction amount exceeding the upper limit value.

* * * * *